United States Patent [19]

Caras

[11] 4,032,316

[45] June 28, 1977

[54] METHOD OF SEALING A GLASS/TUBULATION TO A PLATE

[75] Inventor: Bernard Caras, Princeton, N.J.

[73] Assignee: Burroughs Corporation, Detroit, Mich.

[22] Filed: Nov. 26, 1975

[21] Appl. No.: 635,736

[52] U.S. Cl. .................................. 65/41; 65/54; 65/104; 65/108; 65/120

[51] Int. Cl.² ............... C03B 29/00; C03C 27/00

[58] Field of Search ........... 65/34, 36, 41, 54, 120, 65/108, 104, 117, 270

[56] References Cited

UNITED STATES PATENTS

| | | | |
|---|---|---|---|
| 2,371,486 | 3/1945 | Walker | 65/117 X |
| 2,822,646 | 2/1958 | Krefft | 65/54 X |
| 3,708,273 | 1/1973 | Mitchell | 65/120 |
| 3,914,000 | 10/1975 | Beckerman et al. | 65/34 X |

Primary Examiner—Arthur D. Kellogg
Attorney, Agent, or Firm—Kevin R. Peterson; Robert A. Green

[57] ABSTRACT

The disclosure is of a method of preparing an envelope assembly including a glass tubulation in which the tubulation includes a portion of reduced diameter at which a tip-off is formed during the manufacturing process. The method comprises heating the tubulation to an elevated temperature at which surface defects heal, and subsequently securing the tubulation to the envelope in normal fashion while insuring that no further surface defects occur.

4 Claims, 2 Drawing Figures

METHOD OF SEALING A GLASS/TUBULATION TO A PLATE

BACKGROUND OF THE INVENTION

Gas-filled display panels, which have been made for many years, comprise envelopes made up of a base plate and a face plate hermetically sealed together and having a tubulation secured to the base plate. It is customary for a manufacturer to purchase the base plate, face plate, and the tubulations separately, and, during the manufacturing process, these parts are handled, washed and stored before they are assembled to form panels. During manufacture of the panel, the envelope is evacuated and filled through the tubulation secured to the base plate.

The tubulation comprises a glass tube having a flared bell portion, a small diameter tubular portion, and an intermediate necked-down portion, with the flared portion being sealed to the base plate. The tubulation is tipped off at the necked-down portion during the manufacturing process. It has been found in manufacturing such devices, and as they are handled, that the projecting tubulation is easily struck and broken. For many years and up to the time of the present invention, this problem has been tolerated in spite of the considerable cost of such breakage because human error was considered to be the basic cause of the problem and no technological solution was available. The true cause of the problem was not known, and, of course, no solution was available until the present invention was made.

SUMMARY OF THE INVENTION

Briefly, the principles of the invention are useful for reducing breakage of glass tubing or the like which is weakened due to surface defects. The invention comprises suitably heating and softening the tubing to cause the glass to flow and heal surface defects before it is used in preparing devices or before it is used in any way in which it is subject to handling and breakage at the defective surface.

DESCRIPTION OF THE PREFERRED EMBODIMENTS

The principles of the invention are useful for minimizing breakage of tubular glass members, of any kind of glass, which are subject to handling prior to being used in a manufacturing process, and where the members are subject to mechanical stress during a manufacturing process.

Figure 1:
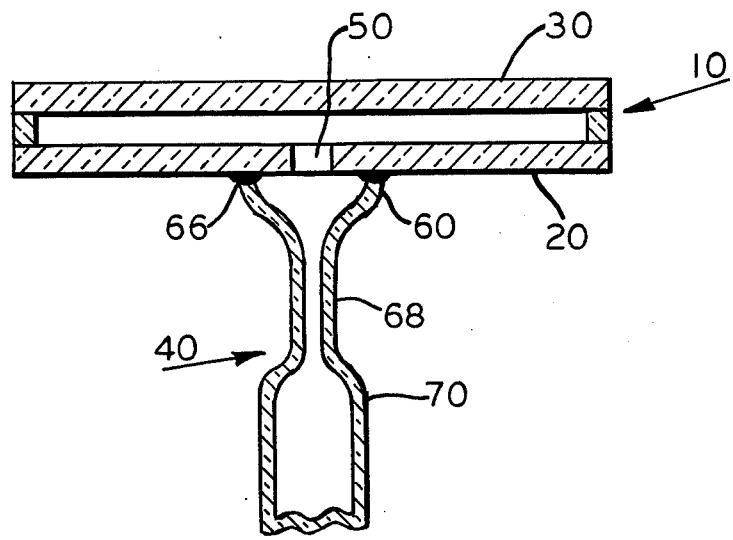
FIG. 1 is a sectional elevational view of a display device and a tubulation secured thereto.

The principles of the invention are particularly useful in preparing a glass tubulation to be used in the manufacture of a flat panel envelope 10 which comprises a glass base plate 20 hermetically sealed to a glass face plate 30. The tubulation 40, in question, is secured to the base plate, and it communicates with the interior of the envelope through a hole 50 in the base plate. The tubulation includes, as seen in FIG. 1, a relatively large-diameter flared portion 60 which is sealed by means of a suitable glass frit 66 or the like to the base plate, a small-diameter necked-down portion 68, and the main tubular portion 70 which extends from the portion 68 and has a larger diameter than the portion 68. Typically, portion 68 may have an outside diameter of about 0.2 inch; portion 70 may have an outside diameter of about 0.25 inch; portion 68 may have a length of about 0.75 inch; and portion 70 may have a length of 4 to 5 inches or so. Thus, it can be seen that the tubulation 40 is exposed, is subject to being struck by an operator during manufacture of the panel, and is particularly subject to breakage at the samll-diameter portion 68.

In manufacturing the panel, the tubulation 40, as shown and described, is formed by well-known techniques, and such tubulations are either made by the panel manufacturer, or they are purchased in this form in large numbers and stored in containers until they are used. Before they are used, they are washed and handled again. During all of this handling and transporting, the surfaces of the tubulations are marred by scratches, weathering, or the like, which weaken the glass and render the tubulations subject to breakage, even with light impact on any portion thereof.

Figure 2:
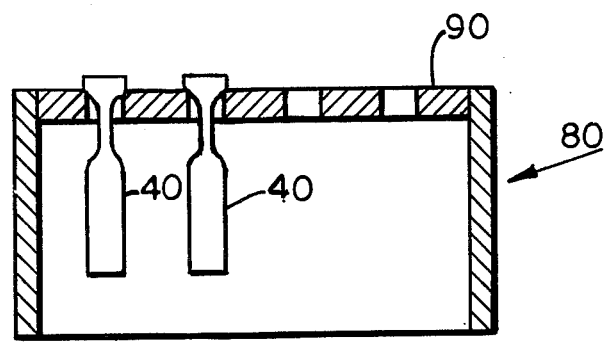
FIG. 2 is a side elevational view, partly in section, of apparatus for holding tubulations processed according to the invention.

According to the invention, before tubulations are secured to base plates 20, they are placed in a carrier 80 of the type shown in FIG. 2 or any other type suitable to protect the tubulation surface. This carrier comprises a frame of stainless steel having an apertured plate 90 in which the tubulations are inserted and supported on their flared portions with the necked-down portions and entire surface protected. The tubulations thus supported can be washed and otherwise processed and prepared for attachment to a panel base plate without damage. According to the invention, the tubulations, thus supported in carrier 80, are heated in air to a temperature at which they soften and their surfaces flow and all surface defects heal. Thus, a new "pristine" surface is formed. It is noted that, as supported in the rack 90, the force of gravity assists the heated tubulation in achieving the desired flow and removal of the scratched surfaces of the tubulation. For typical tubulations of soda lime glass used in panels known as SELF-SCAN panels, heating at a temperature of about 600° C. for about twenty minutes is satisfactory.

The tubulations may be held in carrier 90 until they are ready to be secured to base plates, at which time each is carefully handled individually. If the tubulations are not used immediately, they should also be protected against weathering in suitable storage areas.

It has been found that tubulations prepared according to the invention, because of their pristine surfaces, have greatly increased strength over those prepared without being processed according to the invention, and mechanical stress which would have broken tubulations in the past, now does not cause breakage.

What is claimed is:

1. The method of forming a gas-filled display panel assembly comprising the steps of forming a glass tube and an apertured base plate of said display panel assembly to which said tube is to be sealed in alignment with said aperture, storing said tube and said plate until they are sealed together and wherein said tube is subject to surface defects being formed therein during storage and handling, vertically supporting said tube in a horizontally disposed carrier, heating said vertically supported tube in said carrier to a predetermined temperature and holding said tube at said temperature at which the surface of said tube flows assisted by the flow of gravity whereby said surface defects are removed and the surface assumes a pristine state, and heat sealing said defect free tube to said apertured base plate.

2. The method of claim 1 and including the step of forming a glass tube of substantially uniform diameter, flaring one end of said tube which is to be secured to the apertured base plate and reducing the diameter of a portion of said tube at which said tube is to be tipped off.

3. The method of claim 2 and including the step of heat sealing the flared end of said glass tube to said apertured base plate in alignment with said aperture.

4. The method of claim 3 wherein said apertured base plate becomes part of an envelope, evacuating said envelope and filling said envelope with a gas through said tube and said aperture.

* * * * *